US010756934B2

United States Patent
Wesemann

(10) Patent No.: US 10,756,934 B2
(45) Date of Patent: Aug. 25, 2020

(54) METHOD FOR CHANNEL ESTIMATION IN A WIRELESS COMMUNICATION SYSTEM, COMMUNICATION UNIT, TERMINAL AND COMMUNICATION SYSTEM

(71) Applicant: Alcatel Lucent, Boulogne Billancourt (FR)

(72) Inventor: Stefan Wesemann, Stuttgart (DE)

(73) Assignee: Alcatel Lucent, Nozay (FR)

( * ) Notice: Subject to any disclaimer, the term of this patent is extended or adjusted under 35 U.S.C. 154(b) by 75 days.

(21) Appl. No.: 15/763,237

(22) PCT Filed: Sep. 22, 2016

(86) PCT No.: PCT/EP2016/072484
§ 371 (c)(1),
(2) Date: Mar. 26, 2018

(87) PCT Pub. No.: WO2017/060093
PCT Pub. Date: Apr. 13, 2017

(65) Prior Publication Data
US 2018/0287834 A1 Oct. 4, 2018

(30) Foreign Application Priority Data
Oct. 8, 2015 (EP) ..................................... 15306583

(51) Int. Cl.
*H04L 25/497* (2006.01)
*H04L 25/02* (2006.01)
*H04B 7/0413* (2017.01)

(52) U.S. Cl.
CPC ........ *H04L 25/497* (2013.01); *H04L 25/0228* (2013.01); *H04L 25/0238* (2013.01); *H04B 7/0413* (2013.01)

(58) Field of Classification Search
CPC ..... H04L 9/3247; H04L 63/10; H04L 25/497; H04W 52/0235; H04W 72/04
See application file for complete search history.

(56) References Cited

U.S. PATENT DOCUMENTS

2004/0085939 A1 5/2004 Wallace et al.
2008/0240278 A1 10/2008 Bliss et al.
(Continued)

FOREIGN PATENT DOCUMENTS

CN 101710851 A 5/2010
CN 103001676 A 3/2013
(Continued)

OTHER PUBLICATIONS

Dan Li, "Pilot-Assisted Channel Estimation Method for OFDMA Systems over Time-Varying Channels," 2009 IEEE, 4 pages.
(Continued)

*Primary Examiner* — Iqbal Zaidi
(74) *Attorney, Agent, or Firm* — Fay Sharpe LLP

(57) ABSTRACT

The invention relates to a method for channel estimation in a wireless communication system. The communication system includes a communication unit provided with a plurality of antennas, and one or more terminals. First, pilot signals are transmitted from each antenna towards the one or more terminals. At the terminals correlative coding is performed with respect to the transmitted pilot signals to form correlatively coded pilot signals. The correlatively coded pilot signals are then retransmitted from the one or more terminals to the plurality of antennas of the communication unit. The communication unit then estimates uplink channels between the one or more terminals and the plurality of antennas based on the correlatively coded pilot signals. Finally, estimates of the downlink channels between the plurality of antennas and the one or more terminals are obtained based on the estimated uplink channels.

12 Claims, 2 Drawing Sheets

(56) References Cited

U.S. PATENT DOCUMENTS

| | | | | |
|---|---|---|---|---|
| 2013/0322721 A1* | 12/2013 | Hogan | ................ | A61B 5/0033 |
| | | | | 382/131 |
| 2014/0219377 A1* | 8/2014 | Guey | ................... | H04B 7/0691 |
| | | | | 375/267 |
| 2019/0149296 A1* | 5/2019 | Mazzarese | ............ | H04L 5/0051 |

FOREIGN PATENT DOCUMENTS

| | | |
|---|---|---|
| CN | 103873125 A | 6/2014 |
| JP | 2006-504336 A | 2/2006 |
| WO | WO 2014/204868 A1 | 12/2014 |

OTHER PUBLICATIONS

Stefan Wesemann, "Semi-Blind Estimaton of FDD Massive MIMO Channels using Correlative Coded Analog Feedback," WSA 2016, Mar. 9-11, Munich, Germany, 8 pages.

Yeon-Geun Lim, "Compressed Channel Feedback for Correlated Massive MIMO Systems," 2014 IEEE, 6 pages.

Dan Li et al., "Pilot-Assisted Channel Estimation Method for OFDMA Systems over Time-Varying Channels," IEEE Communications Letters, vol. 13, No. 11, pp. 826-828, XP011279566, Nov. 2009.

International Search Report for PCT/EP2016/072484 dated Jan. 24, 2017.

* cited by examiner

METHOD FOR CHANNEL ESTIMATION IN A WIRELESS COMMUNICATION SYSTEM, COMMUNICATION UNIT, TERMINAL AND COMMUNICATION SYSTEM

FIELD OF THE INVENTION

Embodiments of the invention relate to a method for channel estimation in a wireless communication system comprising a communication unit and one or more terminals. Embodiments of the invention further relate to a communication unit for communication with one or more terminals in a communication system. Embodiments of the invention further relate to a terminal for communication with a communication unit provided with a plurality of antennas in a communication system. Finally, an embodiment of the invention relates to a communication system comprising a communication unit and one or more terminals.

BACKGROUND

This section introduces aspects that may be helpful in facilitating a better understanding of the invention. Accordingly, the statements of this section are to be read in this light and are not to be understood as admissions about what is known in the art.

In a massive Multiple-Input Multiple-Output (MIMO) communication system a massive MIMO central node, sometimes also referred to as massive MIMO base station, is provided with an antenna array comprising multiple, e.g. M, antennas for serving a plurality of, e.g. K, terminals over the same time/frequency resources using spatial multiplexing. A key factor for successful operation of the multiplexing operation in the massive MIMO communication system relates to the acquisition of sufficiently accurate channel state information (CSI). In particular the massive MIMO base station needs to obtain sufficiently accurate estimates of the frequency responses of the propagation channels between each of its M antennas and each of the K terminals.

Obtaining such CSI is relatively easy for a massive MIMO communication system employing time division duplex (TDD), where the same frequency band is utilized for both uplink and downlink data transmission. CSI may be acquired by simultaneous transmission of orthogonal pilot sequences by the K terminals to the M base station antennas, from which the uplink propagation channel state between each of the M base station antennas and the K terminals is estimated. By virtue of reciprocity, the uplink channels are equal to the downlink channels. The sample duration is independent of the number of base station antennas, and execution of a training scheme to obtain the required propagation channel state estimates is relatively fast as the entire process for K terminals requires K resource samples, and in a typical MIMO system the number of terminals is relatively low as compared to the number of base station antennas.

However, in Europe and North America most wireless communication systems operate using frequency-division duplex (FDD), where uplink and downlink channels are typically located in different frequency bands. Under FDD, the transmission of uplink orthogonal pilot sequences still suffices for the MIMO base station to estimate the state of the uplink propagation channels. However, a further approach is needed for the MIMO base station to obtain sufficiently accurate estimates of the state of the downlink propagation channels, which is generally time-consuming.

Considering a system with M base station antennas and K single-antenna terminals, a known way to acquire the downlink CSI is for the K terminals to send pilot signals towards the M base station antennas, which enable the MIMO base station to obtain the CSI of the uplink channels. Additionally, to obtain the downlink CSI, the M base station antennas simultaneously transmit orthogonal pilot sequences on the downlink, and each of the K terminals receive the combination of pilots through the propagation channels. Each terminal then, in real time, simultaneously transmits its analog composite received pilot signal back towards the base station on the uplink. Through signal processing, and its knowledge of the uplink channels the base station may then reliably estimate the downlink channel states. The entire process requires a minimum of 2M+K resource samples. As the number of base station antennas M is typically much higher than the number of terminals K in a massive MIMO system obtaining reliable CSI for the uplink and downlink propagation channels in a MIMO-system employing FDD is much more cumbersome than obtaining such CSI in a MIMO-system employing TDD.

The article entitled "*Pilot-Assisted Channel Estimation Method for OFDMA Systems over Time-Varying Channels*" by Li et al. in IEEE Communications Letters, Vol. 13, No. 11, pp 826-828 describes approximation of time variations of a frequency domain transmission function in one symbol period by a linear model in time-frequency blocks for each user involved.

US-patent application publication 2014/0219377 describes channel estimation for a very large-scale MIMO system in which a transmitter includes a multiplicity of antennas spaced such that spacing between adjacent antennas provides a spatial correlation coefficient greater than a threshold level. The transmitter selects a subset of the transmit antennas for transmitting pilot reference signals to a receiver. The pilot reference signals are transmitted only from the selected subset. The receiver includes a channel estimator configured to derive a channel estimation for all of the transmit antennas using the received pilot reference signals and known or estimated spatial correlation among the transmit antennas.

It is desirable to reduce the time for obtaining the CSI in a FDD system, in particular for MIMO-systems with a relatively large number of terminals.

SUMMARY

An objective of embodiments of the present invention is to reduce the time for obtaining channel state information, in particular for MIMO-systems with a relatively large number of terminals and employing FDD. For this purpose, an embodiment of the invention relates to a method for channel estimation in a wireless communication system comprising a communication unit and one or more terminals, wherein the communication unit comprises a plurality of antennas, the method comprising: transmitting pilot signals from each antenna of the plurality of antennas towards the one or more terminals; performing correlative coding with respect to the transmitted pilot signals at the one or more terminals to form correlatively coded pilot signals, the correlatively coded pilot signals being provided with a terminal-specific correlation signature or an antenna-specific correlation signature if the one or more terminals comprise more than one antenna; retransmitting the correlatively coded pilot signals from the one or more terminals to the plurality of antennas; estimating uplink channels between the one or more terminals and the plurality of antennas based on the correlatively coded pilot signals; and obtaining estimates of the downlink channels between the plurality of antennas and the one or more terminals based on the estimated uplink channels. In a communication system comprising M antennas and K terminals, this estimation method requires a minimum of 2M resource samples. Consequently, the method is independent of K, and therefore highly attractive for communication systems comprising a relatively large number of terminals configured to be served by the communication unit.

Abovementioned method results in the estimation of uplink channels and estimates obtained for downlink channels that are sufficiently known up to an unknown permutation of the terminal indices (or if terminals have more than one antenna with respect to the antenna indices). Although sufficient for scenarios such as broadcast transmission in the downlink with conjugate beam forming for individual terminals, this ambiguity may cause issues in some other scenarios. For this purpose, in some embodiments, the method further comprises transmitting data signals from the one or more terminals to the plurality of antennas, each data signal comprising information related to an identity of the transmission source from which the data signal originates; and linking uplink and downlink channels to corresponding terminals using the transmission source identity information. The transmission source identity information may be terminal-specific information if the one or more terminals are provided with a single antenna or antenna-specific information if the one or more terminals are provided with more than one antenna.

In some embodiments, correlative coding comprises filtering received pilot signals by an auto-regressive model, preferably an auto-regressive model of order 1. Such auto-regressive model, in particular an auto-regressive model of order 1, is easy to implement. It is relatively simple and efficient in creating spectral diversity.

In some other embodiments, correlative coding comprises executing a circular convolution operation onto the pilot signals. Executing a circular convolution operation onto the pilot signals may enable improvement of covariance matrix estimation accuracy, and may therefore lead to an improved performance.

In some embodiments, estimating uplink channels between the one or more user terminals and the plurality of antennas utilizes a second-order blind identification algorithm. The second-order blind identification algorithm is known in the art, and therefore relatively easy to implement.

Additionally, an embodiment of the invention is related to a communication unit for communication with one or more terminals in a communication system, the communication unit comprising: a plurality of antennas; and at least one channel estimation module; wherein the communication unit is configured to: transmit pilot signals from each antenna of the plurality of antennas towards the one or more terminals in the communication system; receive correlatively coded pilot signals from the one or more terminals at the plurality of antennas, the correlatively coded pilot signals being provided with a terminal-specific correlation signature or an antenna-specific correlation signature if the one or more terminals comprise more than one antenna; estimate uplink channels between the one or more terminals and the plurality of antennas by the at least one channel estimation module based on the coded pilot signals; and obtain estimates of the downlink channels between the plurality of antennas and the one or more user terminals by the at least one channel estimation module based on the estimated uplink channels.

In some embodiments, for reasons set out above, the communication unit further comprises a decoding module and is further configured to: receive data signals from the one or more terminals via the plurality of antennas, the data signals comprising information related to an identity of the transmission source from which the data signal originates; and linking uplink and downlink channels to corresponding terminals by the at least one decoding module using the transmission source identity information as received.

In some embodiments, the at least one channel estimation module is configured to estimate the uplink channels by utilizing a second-order blind identification algorithm.

Additionally, an embodiment of the invention is related to a terminal for communication with a communication unit provided with a plurality of antennas in a communication system, the terminal comprising: a transceiver for respectively receiving signals from and transmitting signals to the plurality of antennas of the communication unit; and a coding unit; wherein the terminal is configured to: receive pilot signals transmitted from each antenna of the plurality of antennas; perform correlative coding with respect to the received pilot signals using the coding unit to form correlatively coded pilot signals, the correlatively coded pilot signals being provided with a terminal-specific correlation signature or an antenna-specific correlation signature if the terminal comprises more than one antenna; and retransmit the correlatively coded pilot signals to the plurality of antennas thereby enabling the communication unit to estimate uplink channels based on the coded pilot signals and to obtain estimate of downlink channels based on the estimated uplink channels.

In some embodiments, for reasons set out earlier, the terminal may further be configured to transmit a data signal to the plurality of antennas, the data signal including information related to an identity of the transmission source from which the data signal originates.

In some embodiments, correlative coding as performed by the coding unit comprises filtering received pilot signals by an autoregressive model.

The terminal according to any one of claims 10-12, wherein the terminal is a user terminal. Alternatively, the terminal may be a relay station.

Finally, an embodiment of the invention relates to a communication system comprising an embodiment of abovementioned communication unit and an embodiment of one or more of abovementioned terminals.

BRIEF DESCRIPTION OF THE DRAWINGS

Embodiments of the present invention will now be described further, with reference to the accompanying drawings, in which FIG. 1 schematically shows an example of a communication network in which embodiments of the invention may be implemented.

DESCRIPTION OF THE EMBODIMENTS

Figure 1:
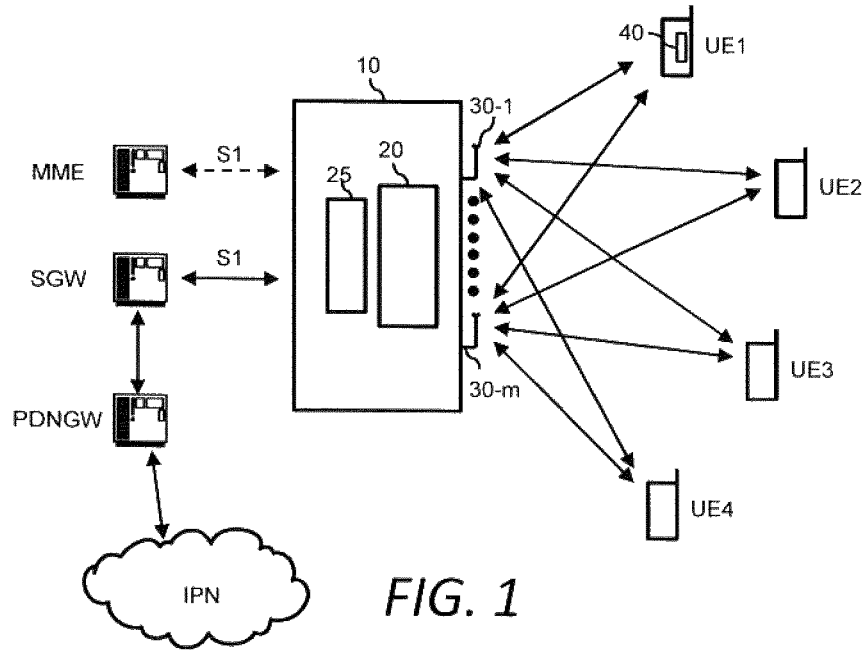

The description and figures merely illustrate the principles of the invention. It will be appreciated that those skilled in the art will be able to devise various arrangements that, although not explicitly described or shown herein, embody the principles of the invention. Furthermore, all examples recited herein are principally intended expressly to aid the reader in understanding the principles of the invention and are to be constructed as being without limitation to such specifically recited examples and conditions. Moreover, all statements herein reciting principles, aspects and embodiments of the invention, as well as specific examples thereof, are intended to encompass equivalents thereof.

In the following description, illustrative embodiments will be described with reference to acts and symbolic representations of operations (e.g., in the form of flowcharts) that may be implemented as program modules or functional processes that include routines, programs, objects, components, data structures, etc., that when executed perform particular tasks or implement particular abstract data types and may be implemented using existing hardware at existing network elements. Such existing hardware may include one or more Central Processing Units (CPUs), digital signal processors (DSPs), system-on-chip (SOC) devices, application-specific-integrated-circuits (ASICs), field programmable gate arrays (FPGAs) computers or the like machines that once programmed become particular machines. In at least some cases, CPUs, SOCs, DSPs, ASICs and FPGAs may generally be referred to as processing circuits, processors and/or microprocessors.

The various modules described herein may thus be implemented or performed with a general-purpose processor, a DSP, an ASIC, an FPGA or other programmable logic device, discrete gate or transistor logic, discrete hardware components or any combination thereof designed to perform the functions described herein. Further the functionalities of various modules may be embodied directly in hardware, in a software module executed by a processor, or in a combination of the two.

As will be understood, the "terminals" and "base stations" as described herein may further include memory. The memories may include any non-transitory computer-readable medium known in the art including, for example, volatile memory such as static random access memory (SRAM), and dynamic random access memory (DRAM), and/or non-volatile memory, such as read only memory (ROM), erasable programmable ROM, flash memories, hard disks, optical disks and magnetic tapes.

As used herein, the term "terminal" may be considered synonymous to, and may hereafter be occasionally referred to, as a client, mobile unit, mobile station, mobile user, user equipment (UE), subscriber, user, remote station, access terminal, receiver, relay station, small cell, relay cell etc., and may describe a remote user of wireless resources in a wireless communication network. In the MIMO system, a terminal may have one or more antennas.

Similarly, as used herein, the term "base station" may be considered synonymous to, and may hereafter be occasionally referred to, as a eNode B, (base) transceiver station (BTS), central node etc., and may describe a transceiver in communication with and providing wireless resources to mobiles in a wireless communication network. As discussed herein, base stations may have all functionally associated with conventional, well-known base stations in addition to the capability to perform the methods discussed herein.

FIG. 1 schematically shows an example of a communication network according to the standard 3GPP LTE, also known as "4G", in which embodiments of the invention may be implemented. The communication network comprises a radio access node 10, e.g. a base station, user terminals UE1, UE2, UE3, UE4, a serving gateway SGW, a packet data network gateway PDNGW, and a mobility management entity MME. Hereinafter, the radio access node 10 may also be referred to as (massive) Multiple-Input Multiple-Output (MIMO) base station 10. The MIMO base station 10 comprises at least one channel estimation module 20, at least one decoding module 25, and is provided with a plurality of antennas 30-1, . . . , 30-m. The user terminals UE1-UE4 are connected via radio connections to the MIMO base station 10. Although for clarity reasons merely shown for UE1, all user terminals UE1-UE4 comprise a coding unit 40. The MIMO base station 10 is communicatively connected to the serving gateway SGW and to the mobility management entity MME, i.e. to the evolved packet core (EPC), via a so-called S1-interface. The serving gateway SGW is communicatively connected to the packet data network gateway PDNGW, which in its turn is communicatively connected to an external IP network IPN.

The S1 interface is a standardized interface between a base station, i.e. an eNodeB in this example, and the evolved packet core (EPC) and has two flavors. First, S1-MME is the interface for exchange of signaling messages between the MIMO base station 10 and the mobility management entity MME. Secondly, S1-U is the interface for transport of user datagrams between the MIMO base station 10 and the serving gateway SGW.

The serving gateway SGW is configured to perform routing of IP user data between the MIMO base station 10, as well as other base stations (not shown) in the communication network, and the packet data network gateway PDNGW. Additionally, the serving gateway SGW serves as a mobile anchor point during handover either between different base stations, or between different access networks.

The packet data network gateway PDNGW represents the interface to the external IP network IPN and terminates the so-called Evolved Packet System (EPS) bearer, which is established between a user terminal and its serving base station.

The mobility management entity MME is configured to perform tasks related to subscriber management and session management, and also executes mobility management during handover between different access networks.

In downlink, IP data received from the external IP network IPN are transmitted from the packet data network gateway PDNGW via the serving gateway SGW to the MIMO base station 10 on an EPS bearer. The MIMO base station 10 then processes the IP data and transmits the IP data via the plurality of antennas 30-1, . . . , 30-m to the respective user terminal over an air interface. In uplink, data transmission is performed in an analogous way as described above with respect to downlink, but in the reverse direction from the user terminal to the external IP network. IPN. Hereinafter, uplink and downlink will be discussed with respect to the air interface between MIMO base station 10 and user terminals UE1-UE4. That is, downlink refers to signal transmission from MIMO base station 10 to user terminals UE1-UE4, and uplink refers to signal transmission from user terminals UE1-UE4 to MIMO base station 10.

Figure 2:
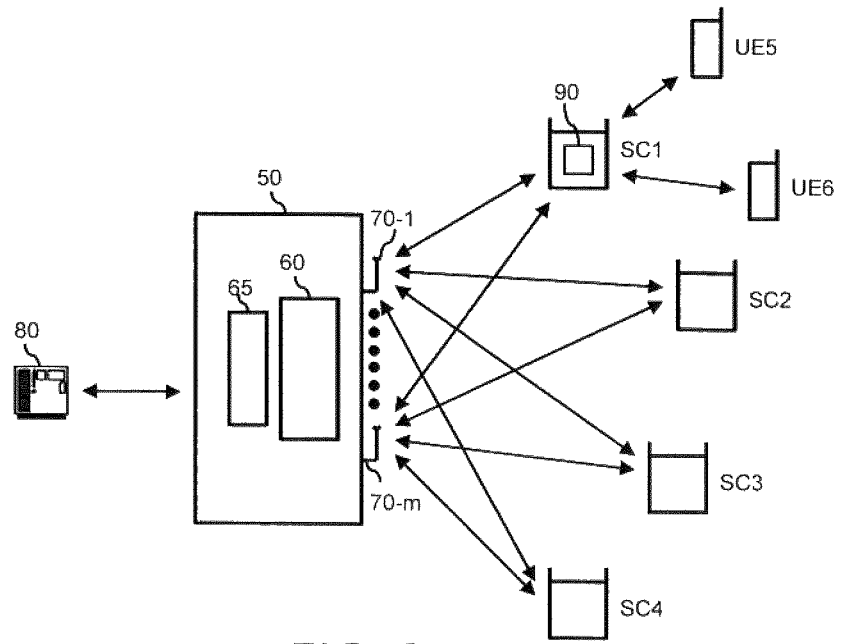
FIG. 2 schematically shows another example of a communication network in which embodiments of the invention may be implemented.

FIG. 2 schematically shows an example of a communication network with a backhaul system architecture having a massive MIMO wireless backhaul link, in which embodiments of the invention may be implemented. The communication network includes a (massive) MIMO central node 50, also referred to as a (massive) MIMO base station, a radio access network (RAN) server 80, and a plurality of relay cells SC1, SC2, SC3, and SC4 for serving user terminals. The relay cells SC1-SC4 may also be referred to as (repeater) small cells SC1-SC4 or terminals SC1-SC4. The MIMO base station 50 comprises at least one channel estimation module 60, at least one decoding module 65, and is provided with a plurality of antennas 70-1, . . . , 70-*m*. The terminals SC1-SC4 are connected via radio connections to the MIMO base station 50. Although for clarity reasons merely depicted for terminal SC1, which serves user equipments UE5 and UE6, it will be understood that each terminal SC1, SC2, SC3, and SC4 is configured to serve one or more user terminals. Furthermore, although for clarity reasons merely shown for SC1, all terminals SC1-SC4 comprise a coding unit 90. The MIMO base station 50 is further communicatively connected to the RAN server 80.

A key factor for successful operation of the multiplexing operation that takes place in a massive MIMO base station, such as MIMO base station 10 in FIG. 1 and MIMO base station 50 in FIG. 2, relates to the acquisition of sufficiently accurate channel state information (CSI). In particular the massive MIMO base station needs to obtain sufficiently accurate estimates of the frequency responses of the propagation channels between each of its M antennas, i.e. antennas 30-1, . . . , 30-*m* in FIG. 1 and antennas 70-1, . . . , 70*m* in FIG. 2 and each of the K terminals it is serving, i.e. UE1-UE4 in FIG. 1 and SC1-SC4 in FIG. 2, in both examples K being equal to 4.

Obtaining such CSI is relatively easy for a massive MIMO communication system employing time division duplex (TDD), where the same frequency band is utilized for both uplink and downlink data transmission. CSI may be acquired by simultaneous transmission of orthogonal pilot sequences by the K terminals to the M base station antennas, from which the uplink propagation channel state between each of the M base station antennas and the K terminals is estimated. By virtue of reciprocity, the uplink channels are equal to the downlink channels. The sample duration is independent of the number of base station antennas, and execution of a training scheme to obtain the required propagation channel state estimates is relatively fast as the entire process for K terminals requires K resource samples, and in a typical MIMO system the number of terminals is relatively low as compared to the number of base station antennas.

However, in Europe and North America most wireless communication systems operate using frequency-division duplex (FDD), where uplink and downlink channels are typically located in different frequency bands. Under FDD, the transmission of uplink orthogonal pilot sequences still suffices for the MIMO base station to estimate the state of the uplink propagation channels. However, a further approach is needed for the MIMO base station to obtain sufficiently accurate estimates of the state of the downlink propagation channels, which is generally time-consuming.

Considering a system with M base station antennas and K single-antenna terminals, a known way to obtain channel state estimates for both the uplink and the downlink propagation systems in an FDD massive MIMO-system uses direct uplink pilots and downlink pilots plus (analog) feedback. In the following process description, it is assumed that the frequency dependence of the uplink and downlink channels is suppressed. Furthermore, it should be understood that the subsequently described training and corresponding signal processing occurs within each frequency interval (referred to as subband) over which the propagation channels are considered to be substantially constant.

In the first phase of this two-phase process, considering a system with M base station antennas and K single antenna terminals, the K terminals collectively transmit on the uplink channel orthogonal pilot sequences with a sample duration $\tau_u$, represented by a $\tau_u \times K$ unitary matrix $\Psi_u$. The antenna array of the MIMO base station receives a $M \times \tau_u$ signal, i.e.

$$Y_u = \sqrt{\rho_u \tau_u} G_u \Psi_u^H + V_u \qquad (1)$$

where the superscript "H" denotes the Hermitian transpose, the matrix $G_u$ denotes the M×K uplink propagation matrix, $V_u$ denotes additive receiver noise, and $\rho_u$ is a measure of the signal-to-noise ratio (SNR) of the uplink channel. Each of the M antennas then correlates its received signal with each of the K pilot sequences to obtain a noisy version of the uplink matrix-valued channel, i.e.

$$Y_u \Psi_u = \sqrt{\rho_u \tau_u} G_u + V'_u \qquad (2)$$

An appropriately scaled version of the uplink matrix-valued channel resulting from equation (2) then constitutes the minimum mean-square estimate for the uplink channels.

During the second phase the M base station antennas transmit orthogonal pilot sequences of sample duration $T_d$ on the downlink channel, represented by a $\tau_d \times M$ unitary matrix $\Psi_d$. The K terminals collectively receive a $K \times \tau_d$ signal, i.e.

$$Y_d = \sqrt{\frac{\rho_d \tau_d}{M}} G_d^H \Psi_d^H + V_d \qquad (3)$$

where the matrix $G_d$ denotes the M×K downlink propagation matrix, $V_d$ denotes additive receiver noise, and $\rho_d$ is a measure of the signal-to-noise ratio (SNR) of the downlink channel. The received signal is then re-transmitted on the uplink, optionally using a scaling factor $\alpha$ to conform to power constraints. The base station then receives a $M \times \tau_d$ signal, i.e, $$Y_{du} = \sqrt{\alpha \rho_u} G_u \left( \sqrt{\frac{\rho_d \tau_d}{M}} G_d^H \Psi_d^H + V_d \right) + V_{du} \qquad (4)$$

Now, each of the M base station antennas may correlate its received signal with each of the M pilot sequences, resulting in a M×M signal, i.e.

$$Y_{du} \Psi_d = \sqrt{\alpha \rho_u} G_u \left( \sqrt{\frac{\rho_d \tau_d}{M}} G_d^H + V'_d \right) + V'_{du} \qquad (5)$$

Since the uplink pilots of the first phase already provided an estimate for the uplink channel, the base station may now estimate the downlink channel, e.g. by means of techniques including, but not limited to, zero-forcing and minimum mean-square error estimation The entire process described above requires a minimum of 2M+K resource samples. As the number of base station antennas M is typically much higher than the number of terminals K in a massive MIMO system obtaining reliable CSI for the uplink and downlink propagation channels in a MIMO-system employing FDD is much more cumbersome than obtaining such CSI in a MIMO-system employing TDD.

Figure 3:
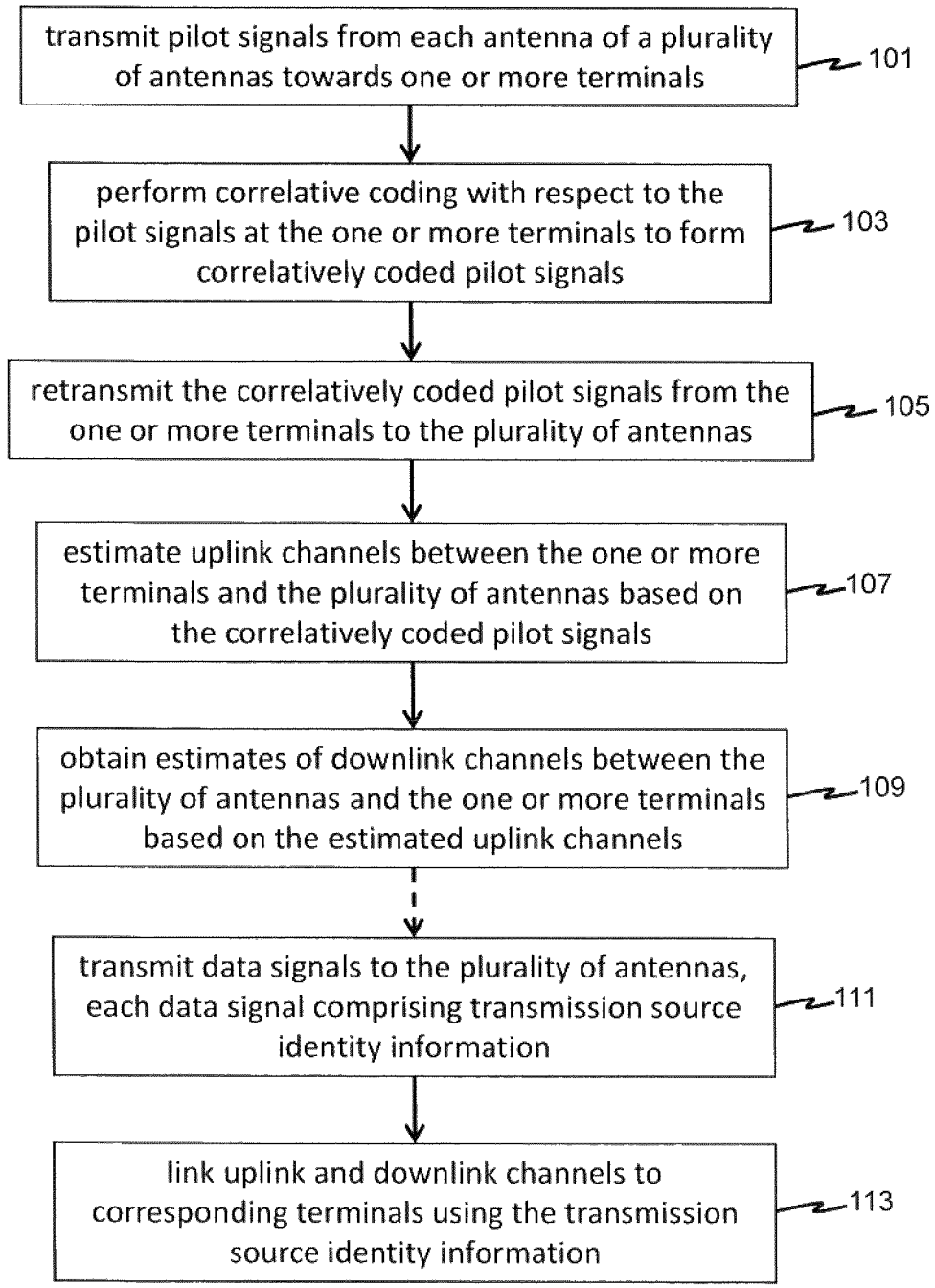
FIG. 3 schematically shows a flow chart of a method for channel estimation in a wireless communication system according to embodiments of the invention.

FIG. 3 schematically shows a flow chart of a method for channel estimation in a wireless communication system comprising a massive MIMO system according to embodiments of the invention. In this method for channel estimation of propagation channels between a communication unit and one or more terminals in a communication system, the communication system comprising a plurality of antennas, first, pilot signals are transmitted from each antenna of the plurality of antennas towards the one or more terminals (action 101). Typically, such pilot signals are linearly independent, preferably orthogonal, to ensure a sufficiently accurate downlink estimation an embodiment of which will be described later.

Upon receipt by the one or more terminals, correlative coding is performed with respect to the received pilot signal at the one or more terminals to form correlatively coded pilot signals (action 103). Correlative coding here refers to the insertion of a known amount of correlation into the pilot signals. For this purpose, as depicted in FIGS. 1 and 2, the terminals are provided with a coding unit. The coding unit may be configured to apply correlative coding to a signal in time domain or in frequency domain, depending on the number of subbands. A time domain coding unit is applicable if the communication system employs only one subband. For that case, the coding unit is configured to provide a received pilot signal with a terminal-specific correlative signature to form the correlatively coded pilot signals, e.g. by applying a Finite Impulse Response (FIR) or Infinite Impulse Response (IIR) filter that introduces a known autocorrelation to the received pilot signal, preferably a normalized version thereof, also referred to as auto-covariance. If a terminal is provided with more than one antenna, the coding unit may be configured to provide a received pilot signal with an antenna-specific and/or terminal-specific correlative signature. For the case of multiple subbands, a frequency domain coding unit is employed, which operates subband-wise by applying a FIR or IIR filter to the subband-specific received pilot signal. This filter introduces a known terminal-specific, and/or antenna-specific, autocorrelation to the received pilot signal. Hereinafter, the term terminal-specific will be used for simplicity. But it will be understood that in embodiments using terminals with more than one antenna this term may be replaced by the term antenna-specific. The correlative coding may include filtering received pilot signals by a terminal-specific auto-regressive model, preferably a terminal-specific auto-regressive model of order 1 ("AR1-model"). The AR1-model is easy to implement because it is simple and efficient in creating spectral diversity.

Note that in order to enable estimation of the uplink channels the applied filters (i.e., correlative coding units) employed by corresponding terminals for the correlative coding have to be known by the base station.

The correlatively coded pilot signals are then retransmitted from the one or more terminals to the plurality antennas of the communication unit (action 105).

The communication unit is provided with at least one channel estimation module for estimating uplink channels between the one or more terminals and the plurality of antennas based on the correlatively coded pilot signals (action 107). A suitable algorithm to accomplish this would be a second-order blind identification (SOBI) algorithm, which is known to a person skilled in the art. The SOBI algorithm estimates spatial covariance matrices, the corresponding estimation error of which reduces to zero as M grows large. In other words, a larger number of MIMO base station antennas results in improved estimation of the uplink channels if the SOBI algorithm is employed.

Finally, estimates of the downlink channels between the plurality of antennas and the one or more terminals may be obtained based on the estimated uplink channels (action 109).

The method for estimation of propagation channels between the communication unit, in particular a MIMO base station, and one or more terminals requires a minimum of 2M resource samples. Consequently, as this estimation scheme, which may also be referred to as training scheme, is independent of K, the method is highly attractive for communication systems comprising a relatively large number of terminals configured to be served by the communication unit.

Note that instead of an AR1-model other types of filters may be used, as long as the filter introduces sufficient spectral diversity and is invertible. For example, instead of an AR1-model which uses a linear convolution, a filter using a circular convolution operation onto the received pilot signals may be used. Estimation of uplink channels (action 107) by blind separation of received (superimposed) signals relies on the estimation of (spatial) covariance matrices for different time lags. However, due to the finite length of the pilot signals such estimation may suffer from a finite sample support. By employing a circular convolution it is possible to introduce correlation between the first samples of a pilot signal, where a linear correlation filter would merely exhibit some transient behavior. As a result, the covariance matrix estimation accuracy may be improved for finite sample support.

A quantitative example of the embodiment described above with reference to FIG. 3 for a MIMO communication system comprising M base station antennas and K terminals may be described as follows. Again, it is assumed that the frequency dependence of the uplink and downlink channels is suppressed. Similarly, it should be understood that training and corresponding signal processing occurs within each frequency interval (i.e., subband) over which the propagation channels are considered to be substantially constant.

First, the M base station antennas transmit on the downlink channel orthogonal pilot sequences of sample duration $\tau_d$, represented by a $\tau_d \times M$ unitary matrix $\tau_d$. The k-th terminal, k ∈ {1, ..., K}, receives a $1 \times \tau_d$ signal, i.e.

$$x_{dk}^H = \left( \sqrt{\frac{\rho_d \tau_d}{M}} g_{dk}^H \Psi_d^H + v_{dk}^H \right) \tag{6}$$

where $g_{dk}$ denotes the M×1 downlink propagation vector for the k-th terminal, and $v_{dk}$ denotes additive receiver noise. Now, instead of immediate re-transmission of the received pilot signals in the uplink, each terminal k first applies a correlation filter that introduces a terminal-specific autocorrelation onto the received pilot sequence $x_{dk}$. Throughout this specification, this operation is referred to as correlative coding, and a pilot signal being subjected to correlative coding is referred to as a correlatively coded pilot signal. As will be discussed in more detail below, providing the pilot signal with a terminal-specific autocorrelation signature, i.e. forming a correlatively coded pilot signal, enables the base station to estimate the uplink channels. The correlative coding by a terminal k may be described by a multiplication of the received pilot sequence $x_{dk}$ with a so-called Toeplitz matrix $C_k$, i.e.

$$y_{uk}^H = x_{dk}^H C_k^H = \left( \sqrt{\frac{\rho_d \tau_d}{M}} g_{dk}^H \Psi_d^H + v_{dk}^H \right) C_k^H \tag{7}$$

where the Toeplitz matrix $C_k$ is to be a lower triangular matrix so that the resulting filter is a causal filter, which realizes a linear convolution. Alternatively, $C_k$ can also be chosen as a circulant matrix in order to realize a circular convolution. A possible choice of suitable Toeplitz matrices $C_k$, for all k e $\{1, \ldots, K\}$ will be described below. Note that in order to enable estimation of the downlink channels at the MIMO base station the filter matrices employed by corresponding terminals have to be known by the base station.

Preferably, the components of the downlink channel vectors $g_{dk}$, for all k, are all independent and identically distributed (complex) Gaussian random variables, which is the case for Rayleigh fading channels. In such case, the received sequences $x_{dk}$, for all k, are mutually uncorrelated with independent and identically (complex) Gaussian elements. Such sequences are spectrally white and indistinguishable from a statistical domain point of view. By judiciously coloring the sequences $x_{dk}$, i.e. assigning distinct spectral patterns by means of correlative coding at the terminals, the MIMO base station is able to identify the uplink channels and to separate the terminal's signals, e.g. by means of the SOBI algorithm.

All k terminals may then re-transmit their correlatively coded pilot signals $y_{uk}$ as defined by equation (7) simultaneously in the uplink, optionally using an appropriate scaling factor $\alpha_k$ to conform to power constraints. The antenna array of the base station then receives a $M \times \tau_d$ signal, i.e.

$$Z_{du} = \sum_{k=1}^{K} \sqrt{\alpha_k \rho_k} \, g_{uk} \left( \sqrt{\frac{\rho_d \tau_d}{M}} g_{dk}^H \Psi_d^H + v_{dk}^H \right) C_k^H + V_{du} \quad (8)$$

The base station may now calculate estimates $\hat{g}_{uk}$ for all uplink channels and the signals $y_{uk}$, both up to a complex scaling factor and up to a permutation of terminal indices. As mentioned previously, such calculation may for example apply a SOBI algorithm. Based on the separated uplink signals $Y_{uk}$ the base station is able to estimate the k-th downlink channel (up to a complex scaling factor) as follows:

$$\hat{g}_{dk}^H = \hat{y}_{dk}^H C_k \Psi_d (\Psi_d^H C_k^H C_k \Psi_d)^{-1} \quad (9)$$

The total number of resource samples required to estimate all of the uplink and downlink channels thus equals 2M.

As mentioned previously, a relatively easy way to achieve sufficient spectral diversity for correlative coding at the terminals is to filter each received signal $x_{dk}$ by an autoregressive model of order 1, for example by using a judiciously chosen coefficient $$\alpha_k = \rho_k \exp(j\theta_k) \quad (10)$$

where $\rho_k$ is typically chosen to have the same value for all k, with $k \in \{1, \ldots, K\}$, so that the coefficients $\alpha_k$ for all k lie on a circle in the complex plane with a radius equal to e.g., r=0.95; that is; $\rho_k$=0.95 for all k. Furthermore, in case of such uniform distribution of $\alpha_k$ on the complex circle, the parameters $\theta_k$ for all k may be calculated as follows:

$$\theta_k = 2\pi(k-1)/K \text{ with } k \in \{1, \ldots, K\} \quad (11)$$

The corresponding filter matrix, $C_k$ is a lower-triangular Toeplitz matrix constructed from the vector $[a_k^0, a_k^1, \ldots, a_k^{M-1}]$. For a case with this results in:

$$C_k = \begin{bmatrix} 1 & 0 & 0 & 0 \\ a_k & 1 & 0 & 0 \\ a_k^2 & a_k & 1 & 0 \\ a_k^3 & a_k^2 & a_k & 1 \end{bmatrix} \quad (12)$$

The radius of the circle in the complex plane (i.e.; the parameter $\rho_k$) may be modified in order to trade-of the spectral overlap of the signals $y_{uk}$ for all k, versus the so-called condition number of the matrix $C_k^H C_k$, which dictates noise amplification within the downlink channel estimation step given in equation (9).

In case of fully analog terminals one has to resort to a (causal) linear convolution as realized by a filter matrix with Toeplitz structure. Additionally, the use of a linear convolution is particularly useful if the pilot signals being used are sufficiently narrow, i.e. if their signal bandwidth is smaller than the coherence bandwidth of the channel over which they are transferred. In contrast, a circular convolution (i.e., a circular filter matrix) requires digital processing, but improves the performance of the blind separation algorithm employed by the MIMO base station for channel estimation purposes, in particular for small pilot lengths and/or small number of MIMO base station antennas.

After performing the estimation of the uplink channels and obtaining the estimates for the downlink channels as described in general with reference to FIG. 3, and illustrated with the quantitative example above, the uplink and downlink channel vectors are sufficiently known up to an unknown permutation of the terminal indices (or if terminals have more than one antenna with respect to the antenna indices). This ambiguity is no problem in scenarios such as the broadcast transmission in the downlink with conjugate beam forming for individual terminals. However, it may cause issues in some other scenarios.

To overcome abovementioned ambiguity the channel estimation method described with reference to FIG. 3 may further include the transmission of data signals in the uplink to the plurality of antennas of the MIMO base station, each data signal comprising information related to an identity of the transmission source from which the data signal originates (action 111). The transmission source may be identified as the terminal itself, in which the transmission source identity information Includes terminal-specific information. Alternatively, if terminals are provided with more than one antenna, the specific antenna transmitting the data signal may be identified as the transmission source. In such case, the transmission source identity information thus includes antenna-specific information. In any case, the identity information may take the form of coded signals with identity-specific scrambling and/or cyclic redundancy check (CRC) checksums.

The decoding module of the MIMO base station may then use the transmission source identity information to link uplink and downlink channels to corresponding terminals (action 113). It will be understood that the expression "corresponding terminals" relates to the terminals itself if the terminals are provided with a single antenna, but may also relate to specific antennas of a terminal if the respective terminal is provided with more than one antenna. In particular, the MIMO base station may apply the estimated uplink channel vectors in order to separate the superimposed uplink signals of all terminals by means of e.g. a minimum mean square error (MMSE) of zero-forcing equalizer. By merely trying the different identities obtained by means of the identity information, the MIMO base station is able to resolve abovementioned index ambiguity without a need for any further channel uses.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for channel estimation in a wireless communication system comprising a communication unit and one or more terminals, wherein the communication unit comprises a plurality of antennas, the method comprising:
   transmitting pilot signals from at least one antenna of the plurality of antennas towards the one or more terminals;
   performing correlative coding with respect to the transmitted pilot signals at the one or more terminals to form correlatively coded pilot signals, the correlatively coded pilot signals being provided with a terminal-specific correlation signature or an antenna-specific correlation signature if the one or more terminals comprise more than one antenna;
   retransmitting the correlatively coded pilot signals from the one or more terminals to the plurality of antennas;
   estimating uplink channels between the one or more terminals and the plurality of antennas based on the correlatively coded pilot signals; and
   obtaining estimates of the downlink channels between the plurality of antennas and the one or more terminals based on the estimated uplink channels, wherein the method further comprises:
   transmitting signals from the one or more terminals to the plurality of antennas, at least one signal comprising information related to an identity of the transmission source from which the signal originates; and
   linking uplink and downlink channels to corresponding terminals using the transmission source identity information.

2. The method according to claim 1, wherein the transmission source identity information is terminal-specific information if the one or more terminals are provided with a single antenna or antenna-specific information if the one or more terminals are provided with more than one antenna.

3. The method according to claim 1, wherein correlative coding comprises filtering received pilot signals by an auto-regressive model, preferably an auto-regressive model of order 1.

4. The method according to claim 1, wherein correlative coding comprises executing a circular convolution operation onto the pilot signals.

5. The method according to claim 1, wherein estimating uplink channels between the one or more user terminals and the plurality of antennas utilizes a second-order blind identification algorithm.

6. An apparatus comprising:
   a plurality of antennas;
   at least one processor; and
   at least one memory including computer program code;
   the at least one memory and the computer program code configured to, with the at least one processor, cause the apparatus at least to perform:
   transmitting pilot signals from at least one antenna of the plurality of antennas towards one or more terminals in a communication system;
   receiving correlatively coded pilot signals from the one or more terminals at the plurality of antennas, the correlatively coded pilot signals being provided with a terminal-specific correlation signature or an antenna-specific correlation signature if the one or more terminals comprise more than one antenna;
   estimating uplink channels between the one or more terminals and the plurality of antennas based at least on the coded pilot signals; and
   obtaining estimates of the downlink channels between the plurality of antennas and the one or more user terminals based at least on the estimated uplink channels, wherein the at least one memory and the computer program code are configured to, with the at least one processor, cause the apparatus at least to perform:
   receiving signals from the one or more terminals via the plurality of antennas, the signals comprising information related to an identity of the transmission source from which the signal originates; and
   linking uplink and downlink channels to corresponding terminals using the transmission source identity information as received.

7. The apparatus according to claim 6, wherein the at least one memory and the computer program code are configured to, with the at least one processor, cause the apparatus at least to perform estimating the uplink channels by utilizing a second-order blind identification algorithm.

8. An apparatus comprising:
   at least one processor; and
   at least one memory including computer program code;
   the at least one memory and the computer program code configured to, with the at least one processor, cause the apparatus at least to perform:
   receiving pilot signals transmitted from at least one antenna of a plurality of antennas;
   performing correlative coding with respect to the received pilot signals to form correlatively coded pilot signals, the correlatively coded pilot signals being provided with a terminal-specific correlation signature or an antenna-specific correlation signature if one or more terminals comprise more than one antenna; and
   retransmitting the coded pilot signals to the plurality of antennas and estimating uplink channels based at least on the coded pilot signals and to obtain an estimate of downlink channels based on the estimated uplink channels, wherein the at least one memory and the computer program code are configured to, with the at least one processor, cause the apparatus at least to perform:
   transmitting signals from the one or more terminals via the plurality of antennas, the signals comprising information related to an identity of the transmission source from which the signal originates; and
   linking uplink and downlink channels to corresponding terminals using the transmission source identity information as received.

9. The apparatus according to claim 8, wherein correlative coding as performed by the coding unit comprises filtering received pilot signals by an autoregressive model.

10. The apparatus according to claim 8, wherein the terminal is a user terminal.

11. The apparatus according to claim 8, wherein the terminal is a relay station.

12. A system comprising the apparatus according to claim 6 and the apparatus according to claim 8.

* * * * *